United States Patent [19]
Zimmerer et al.

[11] 3,730,435
[45] May 1, 1973

[54] TOWABLE DRIVE TOWER FOR CENTER PIVOT IRRIGATION SYSTEMS

[75] Inventors: Arthur L. Zimmerer; Bernard J. Zimmerer; Paul B. Zimmerer, all of Lindsay, Nebr.

[73] Assignee: Lindsay Manufacturing Co., Lindsay, Nebr.

[22] Filed: June 3, 1971

[21] Appl. No.: 149,457

[52] U.S. Cl................239/213, 137/344, 287/53 R, 301/1
[51] Int. Cl..........................A01g 25/02, B05b 3/18
[58] Field of Search.....................239/177, 212, 213; 137/344; 287/53 R; 180/1, 5 R; 301/1

[56] References Cited

UNITED STATES PATENTS

| | | | |
|---|---|---|---|
| 3,623,662 | 11/1971 | Reinke | 239/213 |
| 2,693,393 | 11/1954 | Heth | 287/53 R X |
| 1,168,142 | 1/1916 | Akins | 287/53 R X |
| 2,883,025 | 4/1959 | McKim | 287/53 R X |
| 3,251,630 | 5/1966 | Astley | 301/1 |
| 3,282,365 | 11/1966 | McReynolds | 301/1 X |
| 2,860,007 | 11/1958 | Cornelius | 239/213 X |
| 3,361,360 | 1/1968 | Purtell | 239/213 X |
| 3,512,548 | 5/1970 | Miller | 239/213 X |
| 3,583,639 | 6/1971 | Cornelius | 239/212 |
| 3,628,729 | 12/1971 | Thomas | 239/177 |

Primary Examiner—Robert S. Ward, Jr.
Attorney—Zarley, McKee & Thomte

[57] ABSTRACT

A towable drive tower for center pivot irrigation systems is disclosed herein which permits the system to be towed from one field location to another. A pair of gear boxes are selectively pivotally secured to opposite ends of the drive frame of each of the towers in the system. Each of the gear boxes has a drive wheel mounted on the output shaft thereof which may be selectively changed from a direct connection to a freewheeling connection to permit the entire system, including the center pivot, to be towed longitudinally. A power means is connected to the input shafts of the gear boxes for driving the drive wheels. The gear boses and wheels connected thereto may be pivoted 90° from their normal operating position to a towable position. The drive wheels are then disengaged from their driving connection with the gear boxes. Each of the gear cases have an extended hub which supports the outer end of the output shaft.

8 Claims, 7 Drawing Figures

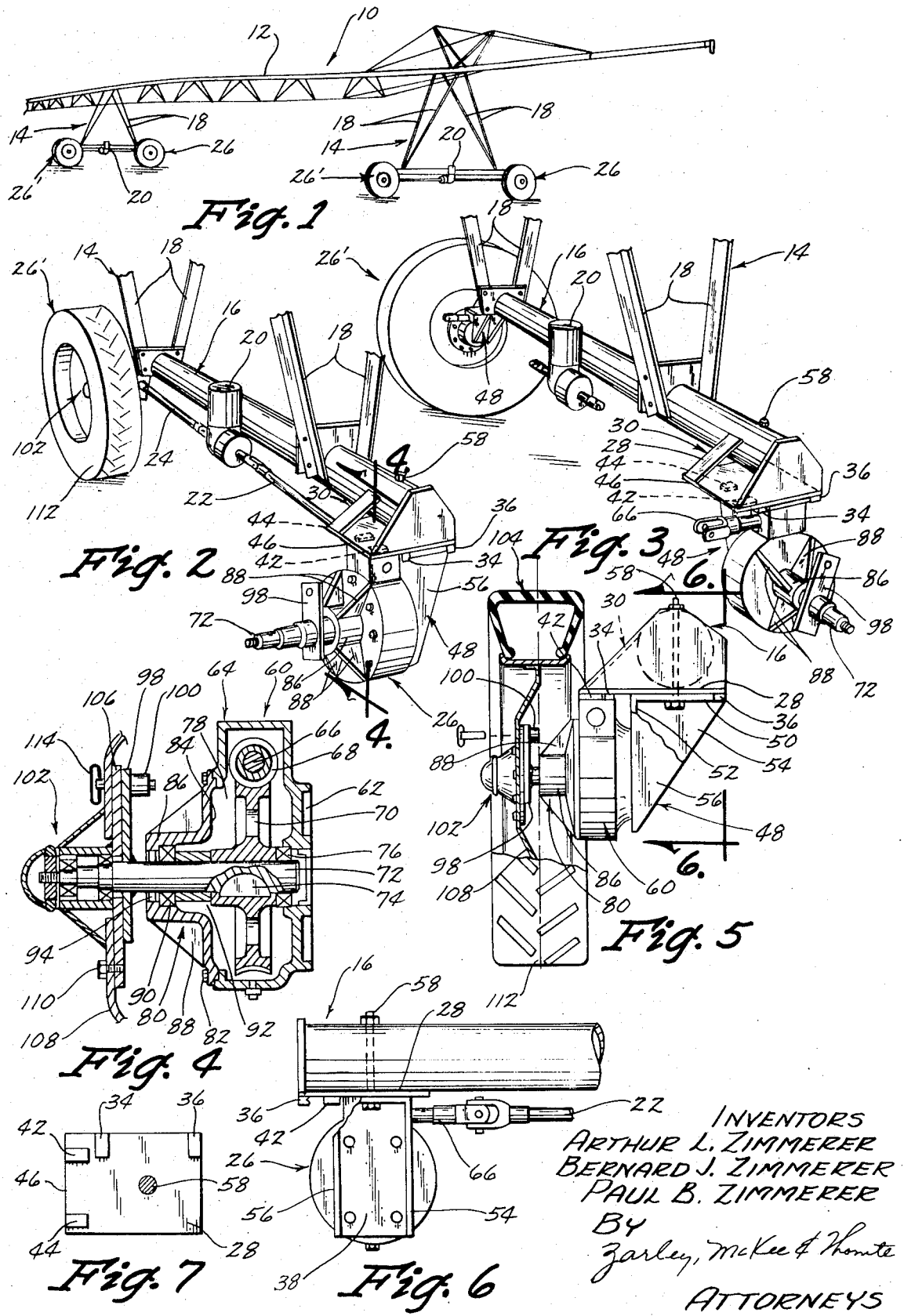

TOWABLE DRIVE TOWER FOR CENTER PIVOT IRRIGATION SYSTEMS

Generally speaking, center pivot irrigation systems employing a plurality of wheeled support towers which are secured to and spaced along the length of the water distribution pipe. Ordinarily, each of the towers comprises a drive frame haing a pair of spaced apart drive wheels rotatably mounted on the ends thereof. Suitable arms connect the drive frame and the pipe to support the pipe above the ground surface. A power means such as an electrically operated gear motor is usually secured to the drive frame intermediate the ends thereof. A pair of drive shafts extend from opposite sides of the gear motor to gear boxes mounted on the ends of the drive frame. Each of the gear boxes comprises input and output shafts which are disposed at a right angle with respect to each other. The outer end of the output shaft is connected to the drive wheel to supply rotational power thereto so that the distribution pipe is moved about its center pivot. A problem exists with this structure due to the fact that the drive wheels must be spaced outwardly from the drive frame to permit their rotation and the drive wheels must be sufficiently spaced from the drive frame to provide clearance between the tires on the drive wheels and the shafts connecting the gear motor and the input shafts of the gear boxes. If the output shaft of the gear box is lengthened to provide the necessary clearance between the tire and the input shaft, an "overhung" load results which puts tremendous weight and strain on the outer end of the output shaft and such weight and strain usually results in failure of the output shaft or of the output outer bearing.

It is sometimes desirable to disconnect the system from its mounting pad at the center pivot to permit the entire system to be moved to another location. The conventional systems do not permit such movement without substantial dismantling of the system.

Therefore, it is a principal object of this invention to provide a towable drive tower for center pivot irrigation systems.

A further object of this invention is to provide a gear box having means thereon for supporting the outer end of the output shaft.

A further object of this invention is to provide a means for pivoting the drive wheels of a drive tower to permit the irrigation system to be towed.

A further object of this invention is to provide a means for disengaging the drive wheels of a drive tower to permit the system to be towed to another location in the field.

A further object of this invention is to provide a gear box and mounting means therefor which are especially well adapted for use on a drive frame of a center pivot irrigation system.

A further object of this invention is to provide a pivotal gear box having an extended hub or nose which supports the outer end of the output shaft.

A further object of this invention is to provide a device of the type described which is economical of manufacture, durable in use and refined in appearance.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a partial perspective view of a typical center pivot irrigation system:

FIG. 2 is a partial perspective view of a drive frame:

FIG. 3 is a view similar to FIG. 2 except that the drive wheels have been pivoted to their tow position:

FIG. 4 is an enlarged sectional view seen along lines 4—4 of FIG. 2:

FIG. 5 is a fragmentary end view illustrating the relationship of the gear box, mounting box, drive wheel and drive frame:

FIG. 6 is a view seen along lines 6—6 of FIG. 5; and

FIG. 7 is a bottom view of the striker plate.

In FIG. 1, the numeral 10 refers generally to a center pivot irrigation system comprising an elongated water distribution pipe 12 which is propelled and supported by a plurality of drive towers 14 spaced along the length thereof. Each of the towers 14 comprises a drive frame 16 which is disposed at a right angle to the longitudinal axis of the pipe 12. A plurality of brace arms 18 connect the drive frame 16 and pipe 12 in conventional fashion. A power means 20 such as an electrically operated gear motor is mounted on the drive frame 16 intermediate the ends thereof and has drive shafts 22 and 24 extending therefrom. The power means 20 is controlled by alignment control means so that the proper amount of rotational power is supplied to the drive shafts 22 and 24 to propel the pipe 12 around its center pivot.

The numerals 26 and 26' refer to the drive wheel assemblies provided on opposite ends of the drive frame 16. Inasmuch as the drive wheel assemblies 26 and 26' are identical with the exception that one of the gear boxes is a "right" gear box and the other is a "left" gear box, only one of the drive wheel assemblies will be described in detail with "'" identifying identical structure on drive wheel assembly 26'. The drive shafts 22 and 24 are detachably connected to the input shafts of the gear boxes on the opposite ends of the drive frame.

A striker plate 28 is secured to the underside of drive frame 16 as illustrated in FIGS. 2 and 5 and is reinforced by gusset plate 30 welded thereto and extending therebetween. A pair of tow lugs 34 and 36 are welded to striker plate 28 at one end thereof and extend downwardly therefrom as illustrated in the drawings. A pair of operation position lugs 42 and 44 are secured to end 46 of striker plate 28 and also extend downwardly therefrom as illustrated in the drawings.

The numeral 48 refers generally to a mounting box comprising a top wall 50, side wall 52 and end walls 54 and 56. Mounting box 48 is selectively pivotally secured to the drive frame and striker plate 28 by means of the pivot bolt 58 which extends upwardly thorugh openings formed in top wall 50, striker plate 28 and drive frame 16. The numeral 60 generally designates a gear box which is secured to wall 52 of mounting box 48 by means of stud bolts or the like extending through wall 38 and being threadably received by suitable openings formed in the inner end 62 of gear case 60.

Gear box 60 comprises generally a housing 64 having an input shaft 66 rotatably extending thereinto. The input shaft 66 is detachably connected to a universal joint on the associated drive shaft 22 or 24. Worm gear 68 is mounted on the inner end of input shaft 66 and is in mesh with a gear 70 as shown in FIG. 4. Gear 70 is mounted on output shaft 72 and is prevented from rotation with respect thereto by means of key 74. The inner end of output shaft 72 is supported by a bearing means 76. Housing 64 has its open outer end 78 closed by an extended hub or nose 80 which is secured to the housing 64 by a plurality of cap screws 82.

Hub 80 comprises a base portion 84 and a hub portion 86 which extends outwardly therefrom as viewed in FIG. 4. A plurality of reinforcing webs 88 extend between the base portion 84 and the hub portion 86 to reinforce the outer end of the hub portion 86. Output shaft 72 rotatably extends through the hub portion 86 and is supported therein by means of a bearing means 90 which is spaced from the hub of the gear 70 by spacer 92. A seal 94 embraces shaft 72 outwardly of bearing means 90 and a cover 96 maintains the seal in position. Flange 98 is secured to shaft 72 by welding or the like as illustrated in FIG. 4 and has a bushing 100 secured thereto adjacent the periphery thereof which registers with an opening formed in the flange.

The numeral 102 refers to the hub assembly which is rotatably mounted on the outer end of output shaft 72 to support the drive wheel 104. Assembly 102 includes a drive plate 106 which is bolted to the central portion of the wheel member 108 by means of studs 110. Tire 112 is mounted on the wheel member 108 in conventional fashion. A drive pin 114 is removably inserted in one of the lug bolt openings and is received in the bushing 100. When drive pin 114 extends through the drive plate 106 and through the flange 98, rotation of the shaft 72 will cause the rotation of the drive wheel 104. When pin 114 is removed, the drive wheel 104 may freely rotate on the shaft 72 wihtout causing the rotation of the shaft 72. In other words, with the pin 114 removed, drive wheel 104 is in a free-wheeling relationship with respect to the output shaft 72.

In normal operation, the drive wheel 104, gear box 60 and mounting box 48 would be in the position illustrated in FIG. 5 with respect to the drive frame 16. In sprinkling operation, the gear motors 20 on each of the towers would propel the pipe 12 about its center pivot while water is being sprayed or sprinkled from the pipe 12 along the length thereof. Conventional alignment means is provided to control the operation of the individual gear motors 20 to maintain the pipe 12 in an aligned position as it pivots about its center pivot. It can be seen in FIG. 5 that the outer end of the hub portion 86 is positioned closely adjacent the center line of the tire 112 which is also approximately the center of the load imposed on the drive wheel. If the extended hub 80 were not provided, the outer end of the output shaft 72 would be unsupported and would result in an "overhung" load which would cause output shaft or bearing failure. The extended hub and the bearing means therein insures that the output shaft 72 is supported closely adjacent the center line of the tire and the center line of the load imposed thereon to provide the necessary support to the output shaft 72. The length of the output shaft 72 is sufficient to provide clearance between the input shafts of the gear boxes and the tires on the drive wheels. The requirement of such clearance requires that the tires be spaced with respect to the gear box housings to permit the input shafts to pass thereby without engaging the tires. Sufficient clearance is provided between the input shaft and the tire of the drive wheel while still providing adequate support for the outer end of the output shaft to insure that the system will function without breakdown.

When it is desired to move the system from one field to another field, the normal method of operation is as follows. The system is mechanically run to the proper or desired towing direction with the center pivot then being disconnected from its mounting pad. The tower wheels are then raised out of ground engagement with a jack or the like. The pivot bolt 58 is then loosened to permit the housing 64 of gear box 60 to drop downwardly out of engagement with the operation position lugs 42 and 44 so that the drive wheel 104, gear box 60 and mounting box 48 may be pivoted 90° with respect to the drive frame 16 such as illustrated in FIG. 3. The input shafts on the gear boxes automatically disconnect from the universal joints on the drive shafts 22 and 24 as the assembly is pivoted to the transport position. The drive shafts are then placed in their riding brackets on the tower. The nut on the pivot bolt 58 is then retightened which causes the mounting box to be moved upwardly between the tow position lugs 34 and 36. Thus, the tow position lugs 34 and 36 maintain the drive wheel 104, gear box 60 and mounting box 48 in the tow position as long as the pivot bolt 58 is securely tightened. The drive pins 114 are then removed from all of the drive wheels so that all of the drive wheels on the towers are able to freely rotate. The tower wheels are lowered into ground engagement. When all of the drive wheel assemblies have been pivoted to their tow positions, the entire system may be towed or moved to the desired location by simply hooking a tractor or the like to the same and pulling the system in the same direction as the longitudinal axis of the pipe 12. The free-wheeling condition of the drive wheels permits the towers to be towed. Since the gear boxes have 50 to 1 ratio worm gears, it is impossible for the towers to be towed unless the drive wheels are placed in their free-wheeling condition.

When the system has been moved to the new location and connected to the mounting pad, the drive wheels are moved from their tow position to their operation position by first jacking up the tower wheels and then simply loosening the pivot bolts 58 and pivoting the entire assembly back to the position of FIG. 5. The input shafts are connected to their respective universal joints on the drive shafts as the assembly is pivoted back to its operation position. The tower wheels are then lowered into ground engagement. In the position of FIG. 5, the upper end of housing 64 is positioned between the operation lugs 42 and 44. The drive pins 114 are then reinserted so that rotation of the output shafts causes rotation of the drive wheels.

If one of the towers should become seriously misaligned, the drive pins 114 on the drive wheels of that particular tower may be removed to permit the tower 14 to be pulled back into position with the pins then being reinstalled. Without the free-wheeling characteristic, it would be necessary to physically drag the misaligned tower back into position which in itself could cause damage to the tower.

Thus it can be seen that a unique means has been provided for towing a center pivot irrigation system. The tow ability of the system is provided by the extended hub gear case and its ability to be pivoted 90° with respect to the drive frame. Thus it can be seen that the invention accomplishes at least all of its stated objectives.

We claim:

1. In combination,
an elongated water distribution pipe,
at least two support towers supporting said pipe,
each of said tower means comprising an elongated, horizontally disposed drive frame means which is disposed transversely to the longitudinal axis of said pipe,
a wheel assembly at each end of said drive frame means,
a power means for driving at least one of said wheel assemblies,
the rotational axis of each of said wheel assemblies being normally parallel to the longitudinal axis of said pipe,
and means for selectively pivoting said wheel assemblies with respect to the drive frame means to a tow position so that the rotational axis of each of said wheel assemblies will be transversely disposed with respect to the longitudinal axis of said pipe to permit said pipe and said support towers to be towed, said driven wheel assembly comprising, a gear box having an output shaft, a drive wheel mounted on said output shaft for rotation therewith,
and means for disengaging said drive wheel from driving connection with said output shaft so that said drive wheel may freely rotate with respect to said output shaft when said wheel assembly has been pitovted to said tow position, said means for disengaging said drive wheel comprising, a first plate means rigidly secured to said output shaft for rotation therewith, said drive wheel being freely rotatably mounted on said output shaft outwardly of said first plate means, and a removable pin means extending through said drive wheel and said first plate means whereby driving connected between said output shaft and rive wheel is provided when said removable pin means is in place and wherein said drive wheel is free to rotate with respect to said output shaft and said first plate means when said pin means is removed.

2. In combination,
an elongated water distribution pipe,
at least two support towers supporting said pipe,
each of said tower means comprising an elongated, horizontally disposed drive frame means which is disposed transversely to the longitudinal axis of said pipe,
a wheel assembly at each end of said drive frame means,
a power means for driving at least one of said wheel assemblies,
the rotational axis of each of said wheel assemblies being normally parallel to the longitudinal axis of said pipe,
and means for selectively pivoting said wheel assemblies with respect to the drive frame means to a tow position so that the rotational axis of each of said wheel assemblies will be transversely disposed with respect to the longitudinal axis of said pipe to permit said pipe and said support towers to be towed,
said driven wheel assembly comprising a gear box secured to said drive frame adjacent the end thereof having an input shaft operatively connected to said power means, a worm gear in said gear box connected to said input shaft, an output shaft extending from said gear box having a gear mounted thereon in said gear box which is in mesh with said worm gear,
a wheel mounting means on said output shaft,
a wheel secured to said wheel mounting means,
and means selectively interconnecting said wheel mounting means and said wheel so that rotation of said input shaft by said power means will normally cause said worm gear, said gear and said wheel to be rotated, said means selectively interconnecting said wheel mounting means and said wheel being operable to permit said wheel to freely rotate with respect to said wheel mounting means, said output shaft, said gear, said worm gear and said input shaft to permit the support tower to be towed.

3. In combination,
an elongated water distribution pipe,
at least two support towers supporting said pipe,
each of said tower means comprising an elongated, horizontally disposed drive frame means which is disposed transversely to the longitudinal axis of said pipe,
a wheel assembly at each end of said drive frame means,
a power means for driving at least one of said wheel assemblies,
the rotational axis of each of said wheel assemblies being normally parallel to the longitudinal axis of said pipe,
and means for selectively pivoting said wheel assemblies with respect to the drive frame means to a tow position so that the rotational axis of each of said wheel assemblies will be transversely disposed with respect to the longitudinal axis of said pipe to permit said pipe and said support towers to be towed,
each of said wheel assemblies being driven by said power means, each of said wheel assemblies comprising, a gear box secured to said drive frame adjacent the end thereof having an input shaft normally rotatable about an axis parallel to the longitudinal axis of said drive frame and an output shaft normally rotatable about an axis parallel to the longitudinal axis of said pipe, a drive wheel connected to said output shaft whereby rotation of said output shaft will normally cause said drive wheel to be rotated, said output shaft having a length sufficient so that clearance exists between said drive wheel and said input shaft, means for supporting the outer end of said output shaft, and means for disengaging said drive wheel from driving connection with said output shaft so that said drive wheel may freely rotate with respect to said output shaft when said wheel assembly has been pivoted to said tow position.

4. The combination of claim 3 wherein said gear box comprises a housing and wherein said means for supporting said gear box comprises an extended hub which is secured to said gear box and which extends outwardly from the gear box housing.

5. The combination of claim 4 wherein a bearing means is provided in said extended hub for rotatably supporting the outer end of said output shaft.

6. The combination of claim 5 wherein said bearing means is positioned closely adjacent the vertical center line of said drive wheel.

7. In combination,
an elongated water distribution pipe,
at least two support towers supporting said pipe,
each of said tower means comprising an elongated, horizontally disposed drive frame means which is disposed transversely to the longitudinal axis of said pipe,
a wheel assembly at each end of said drive frame means,
a power means for driving at least one of said wheel assemblies,
the rotational axis of each of said wheel assemblies being normally parallel to the longitudinal axis of said pipe,
and means for selectively pivoting said wheel assemblies with respect to the drive frame means to a tow position so that the rotational axis of each of said wheel assemblies will be transversely disposed with respect to the longitudinal axis of said pipe to permit said pipe and said support towers to be towed,
said driven wheel assembly comprising a gear box having an output shaft, a drive wheel mounted on said output shaft for rotation therewith, and means for disengaging said drive wheel from driving connection with said output shaft so that said drive wheel may freely rotate with respect to said output shaft when said wheel assembly has been pivoted to said tow position.

8. The combination of claim 7 wherein a horizontally disposed plate means is secured to the underside of each end of said drive frame, at least a first pair of operation lugs secured to said plate means and extending downwardly therefrom in a spaced apart relationship, at least a second pair of tow lugs secured to said plate means and extending downwardly therefrom in a spaced apart relationship, a mounting box means below said plate means, said mounting box means being positioned between said tow lugs when said wheel assembly has been pivoted to said tow position, a gear box secured to said mounting box and being received between said operation lugs when said wheel assembly is in its normal operating position, a pivot bolt means extending through said mounting box means, said plate means and said drive frame to maintain said mounting box between said tow lugs when said wheel assembly is in its tow position, and to maintain said gear box between said operation lugs when said wheel assembly is in its normal operating position.

* * * * *